United States Patent [19]

Tajima et al.

[11] Patent Number: 4,500,822
[45] Date of Patent: Feb. 19, 1985

[54] DIGITAL CAPSTAN SERVO CIRCUIT

[75] Inventors: Shigeru Tajima; Hiroshi Okada; Kenji Nakano, all of Kanagawa, Japan

[73] Assignee: Sony Corporation, Tokyo, Japan

[21] Appl. No.: 534,508

[22] Filed: Sep. 21, 1983

[30] Foreign Application Priority Data

Sep. 28, 1982 [JP] Japan .......................... 57-146850[U]
Sep. 30, 1982 [JP] Japan .......................... 57-148915[U]

[51] Int. Cl.³ ............................................... G05B 5/00
[52] U.S. Cl. ...................................... 318/314; 318/318; 318/326; 318/329
[58] Field of Search ............... 360/73; 318/314, 318, 318/341, 326, 329, 608, 6; 328/35

[56] References Cited

U.S. PATENT DOCUMENTS

| | | | |
|---|---|---|---|
| 3,331,006 | 7/1967 | Strand et al. | 318/314 |
| 3,548,318 | 12/1970 | Yorksie | 328/35 |
| 4,061,950 | 12/1977 | Kayanuma | 318/314 |
| 4,216,419 | 8/1980 | Van Dam et al. | 318/314 X |
| 4,242,619 | 12/1980 | Nakamura et al. | 318/318 X |
| 4,254,367 | 3/1981 | Sakamoto | 318/318 X |

Primary Examiner—Ulysses Weldon
Attorney, Agent, or Firm—Lewis H. Eslinger; Alvin Sinderbrand

[57] ABSTRACT

A digital capstan servo circuit controls the rotation of a capstan motor used for sending a recording medium of a recording apparatus having a recording circuit for recording a plurality of pilot signals instead of CTL signals used for a tracking servo of the capstan motor in a reproducing mode. The pilot signals have different frequencies respectively and are recorded under being mixed with a video signal on video tracks. In the recording mode, a rotation speed information obtained from a counter of which a counting value is latched by a latch pulse produced from FG signals which are generated synchronously with the capstan motor and a rotation phase information obtained from the counter of which a counting value is latched by a latch pulse produced from an oscillator, an output signal of the oscillator having the same frequency as that of but a different phase from as that of the FG signals, are mixed to be a control signal of the capstan motor.

6 Claims, 25 Drawing Figures

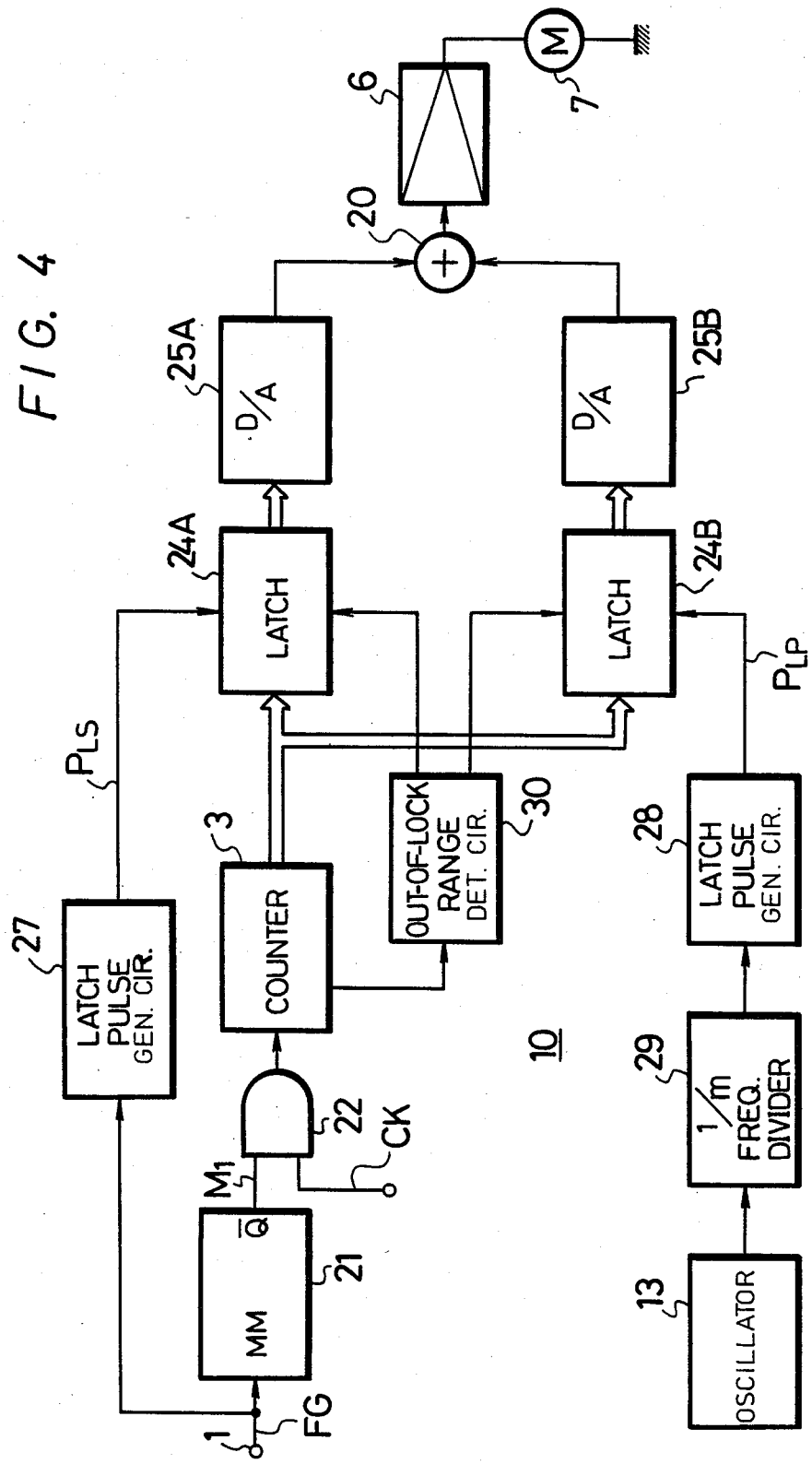

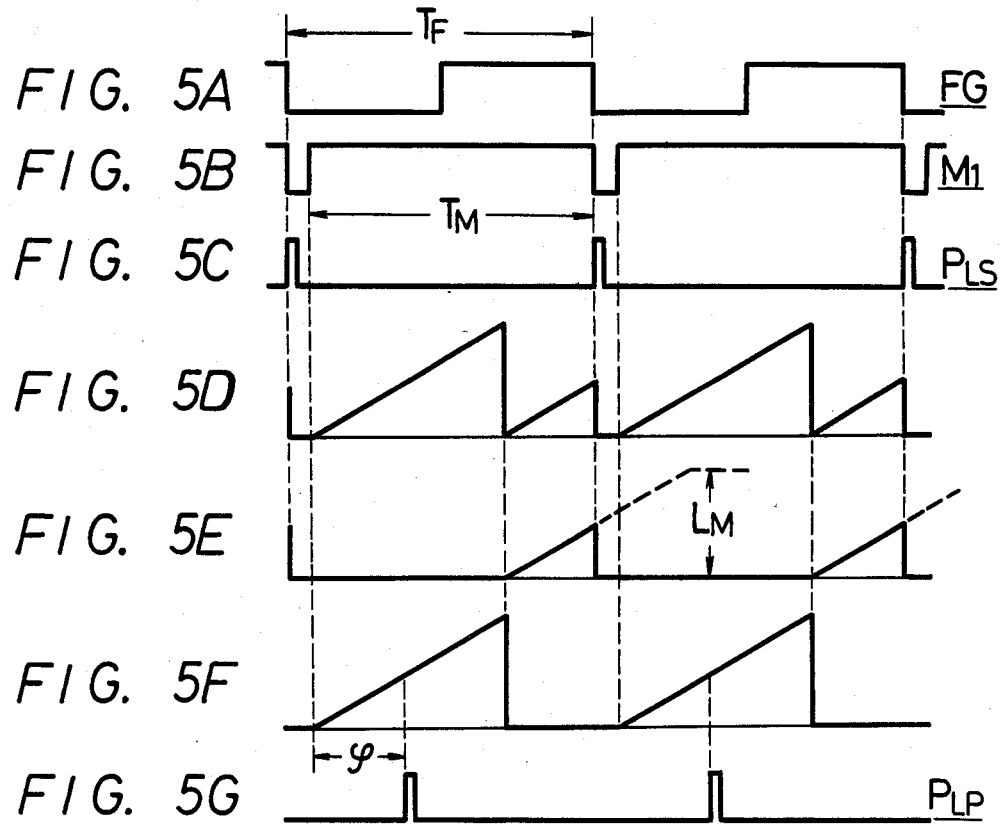
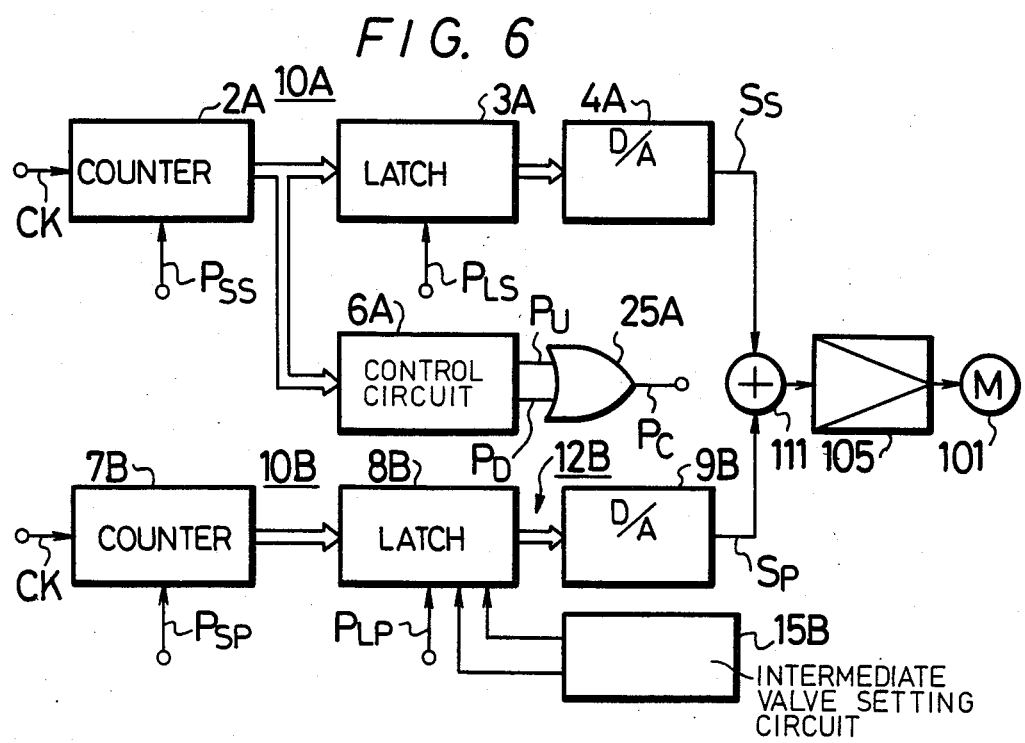

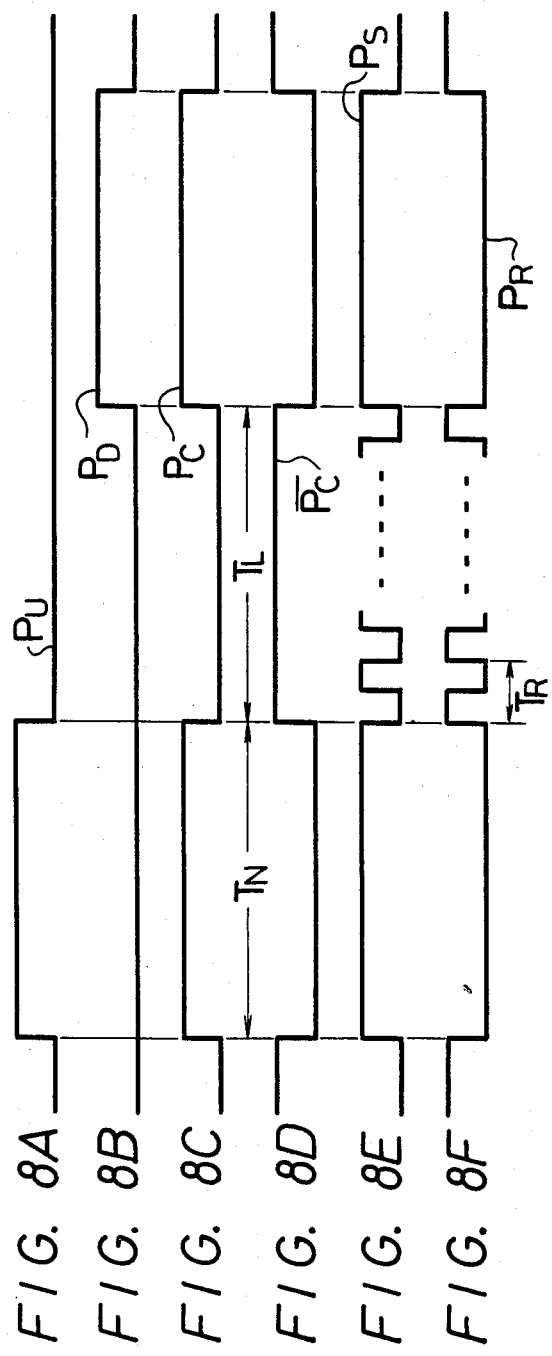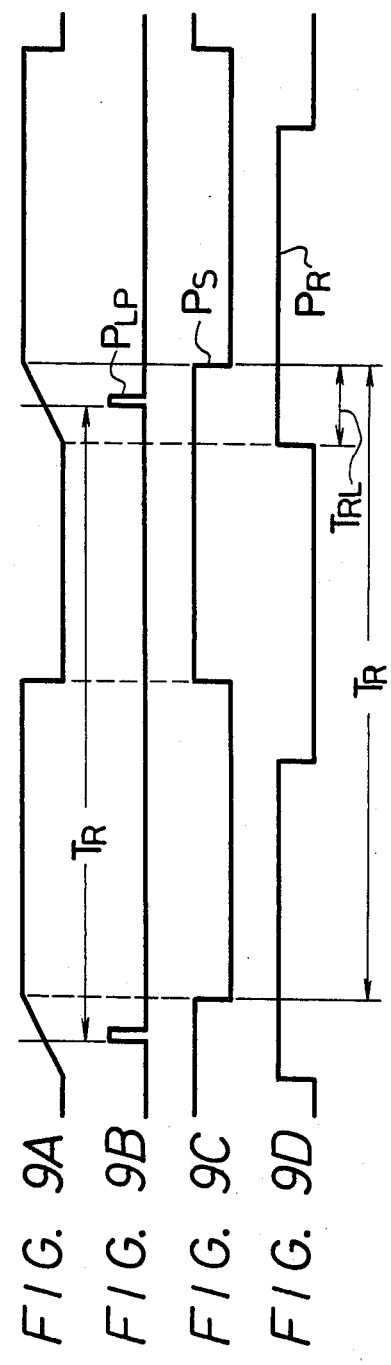

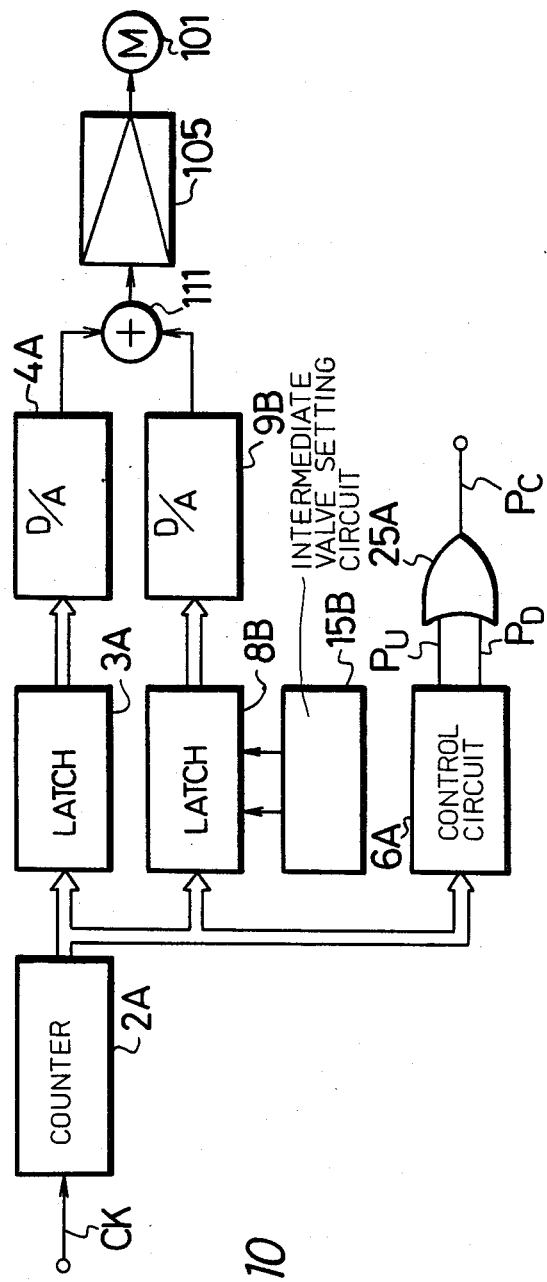
F I G. 10
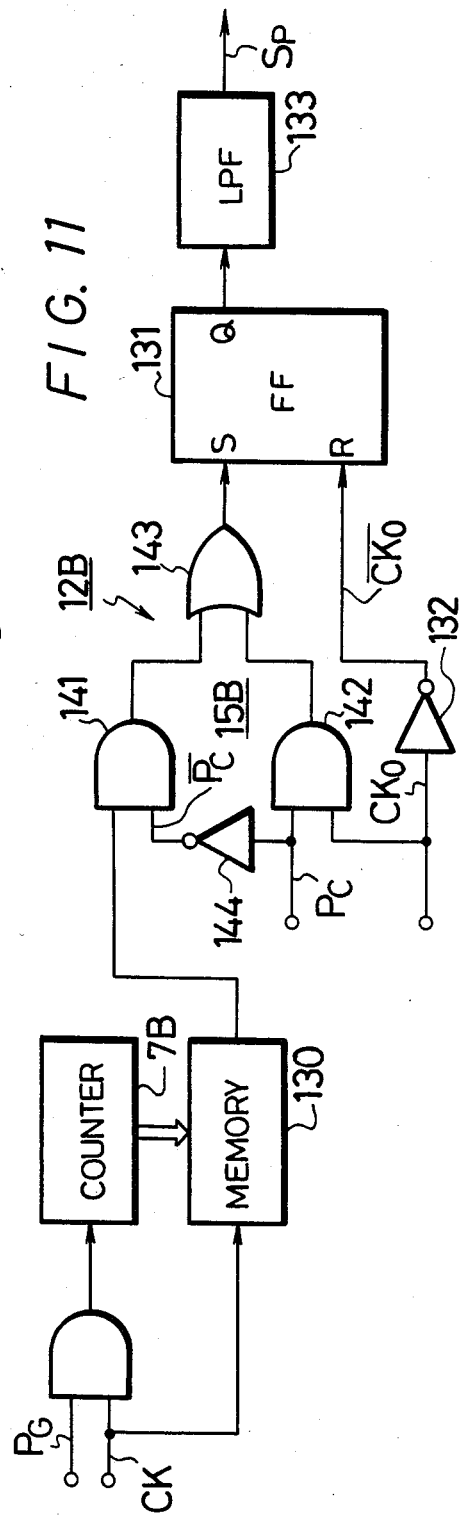
F I G. 11

DIGITAL CAPSTAN SERVO CIRCUIT

BACKGROUND OF THE INVENTION

1. Field of the Invention

The present invention relates to a servo circuit used for a video tape recorder (VTR), and particularly relates to a digital capstan servo circuit.

2. Description of the Prior Art

In general, a capstan servo circuit for a VTR is formed of a rotation speed servo system and a rotation phase servo system. Of the rotation phase servo systems used for the VTR, particularly the rotation phase servo system in a reproducing mode is controlled in such a manner that a control pulse (CTL) having the frequency of 30 Hz recorded on tracks of a tape is reproduced and then this control pulse becomes coincident with an inner reference signal. Although such servo technique is disclosed in detail in, for example, U.S. Pat. No. 4,242,619, such servo technique will hereinafter be described briefly.

FIG. 1 is a block diagram showing an example of a conventional digital capstan servo circuit including a rotation speed servo in the recording system when such rotation phase servo is performed.

In the figure, reference numeral 10S generally designates a rotation speed servo system and reference numeral 10P a rotation phase servo system. A rotation signal FG proportional to the revolution speed of a capstan is generated from a frequency generator mounted to a flywheel of the capstan though not shown. The rotation signal FG is supplied through a terminal 1 to a gate circuit 2 for a clock signal $CK_1$ and the gate time for the clock signal $CK_1$ is controlled in response to the rotation speed of the capstan.

The clock signal $CK_1$ thus gated through the gate circuit 2 is supplied to a counter 3 which measures the rotation speed of the capstan and in which a counter output corresponding to the rotation speed of the capstan is formed. This counter output is supplied to a PWM (pulse width modulation) signal generator 4 as a PWM signal and a PWM output proportional to the rotation speed of the capstan is formed by the PWM signal generator 4. The PWM output is smoothed by a low pass filter 5 and then supplied through an amplifier or driver circuit 6 to a capstan motor 7 as a rotation speed control signal.

On the other hand, the rotation phase servo 10P is a constant phase servo which performs such a servo that the rotation phase of the capstan is locked to the phase of the inner reference signal.

As is known well, the capstan is provided with a pulse generator (not shown) from which a pulse signal PG indicative of the rotation phase of the capstan is generated. This pulse signal PG is supplied through a terminal 11 to a flip-flop 12 which will generate a gate pulse. And, an output from a reference signal oscillator 13 is supplied to a frequency divider 14 which then generates a reference signal PR having the frequency same as that of the pulse signal PG and a reference phase. This reference signal PR is supplied to the flip-flop 12 which thus generates a gate pulse corresponding to a phase difference between the signals PR and PG.

Consequently, an AND gate 16 delivers a clock $CK_2$ during only the period in which the above gate pulse is supplied thereto. The clock $CK_2$ delivered from the AND gate 16 is fed to a rotation phase measuring counter 17 to drive it. The counter output is supplied to a PWM signal generator 18 as a PWM signal, thus forming a PWM output corresponding to the rotation phase.

This PWM output is smoothed by a low pass filter 19 and then supplied to the capstan motor 7 as a rotation phase control signal similarly as mentioned above. Thus, the phase servo operation is performed in such a way that the rotation phase of the capstan is locked to the phase of the reference signal PR.

Reference numeral 20 designates an adder or mixer which adds the rotation phase control signal and the rotation speed control signal together.

As set forth above, according to the conventional capstan servo circuit, the rotation speed servo system 10S and the rotation phase servo system 10P are wholly formed independently.

Recently, such a phase servo system is proposed in which a pilot signal being frequency-multiplexed on a video signal is reproduced and this reproduced pilot signal is used as a reference signal for the tracking in a reproducing mode to control the revolution speed of the capstan motor to thereby perform the rotation phase servo.

First to fourth pilot signals $S_{P1}$ to $S_{P4}$ of single frequency (shown in FIG. 2), which are each constant in frequency interval and whose frequencies become high sequentially, are used as the above pilot signal. In order to record one pilot signal on one track being recorded, the first to fourth pilot signals $S_{P1}$ to $S_{P4}$ are sequentially frequency-multiplexed on the video signal and then recorded thereon at every fields. Thus, as shown in FIG. 2, frequencies $f_1$ to $f_4$ of the pilot signals $S_{P1}$ to $S_{P4}$ recorded on the tracks $T_1$ to $T_4$ which adjoin to one other become different from one other.

A track width $T_p$ in a reproducing mode is wider than a track width $T_R$ in a recording mode (see FIG. 3). Then, if as shown in FIG. 3 the crosstalk component of the pilot signals $S_{P1}$ and $S_{P3}$ from the adjoining tracks $T_1$ and $T_3$ upon playback mode is detected and the rotation speed of the capstan motor is controlled in such a manner that the levels of the pilot signals $S_{P1}$ and $S_{P3}$ may become equal to each other, the reproducing tracking can be established and thereby the rotation phase servo system of the capstan in the reproducing mode can be realized.

OBJECTS AND SUMMARY OF THE INVENTION

Accordingly, it is an object of the present invention to provide an improved digital servo circuit which can obviate the afore-mentioned defects inherent in the conventional capstan servo circuit.

It is another object of the present invention to provide a digital capstan servo circuit capable of simplifying the circuit configuration by common use of servo system and improving the servo characteristic.

It is a further object of the present invention to provide a digital capstan servo circuit capable of reducing the duration of phase lock time by generating a predetermined phase control signal to be held.

It is a yet further object of the present invention to provide a digital capstan servo circuit suitable for use with a video tape recorder (VTR).

According to one aspect of the present invention, there is provided a digital capstan servo circuit used for controlling a rotation of a capstan motor of a magnetic recording apparatus having a recording circuit for recording a plurality of pilot signals mixed with a video signal on video tracks instead of control (CTL) pulses used for a tracking servo circuit in a reproducing mode comprising:

(a) means for generating FG pulses in response to the rotation of said capstan motor;
(b) means for generating clock pulses;
(c) means for generating a window pulse from said FG pulses;
(d) means for counting said clock pulse during the period in which said window pulse is generated and said counter means is self reset during said period;
(e) means for generating a first latch pulse from said FG pulses used for latching a first counting value of said counting means at a first timing position for obtaining a rotation speed information;
(f) means for generating a second latch pulse used for latching a second counting value of said counting means at a second timing position for obtaining a rotation phase information; and
(g) means for producing a control signal by mixing said first and second counting values.

The other objects, features and advantages of the present invention will become apparent from the following description taken in conjunction with the accompanying drawings through which the like references designate the same elements and parts.

BRIEF DESCRIPTION OF THE DRAWINGS

FIG. 4 is a block diagram showing an embodiment of a digital capstan servo circuit according to the present invention;

FIGS. 5A to 5G are respectively timing charts for explaining the operation of the digital capstan servo circuit shown in FIG. 4;

FIG. 6 is a block diagram showing an example of a speed and phase control circuit used in the digital capstan servo circuit shown in FIG. 4;

FIGS. 8A to 8F and FIGS. 9A to 9D are respectively timing charts used for explaining the operation of the circuit shown in FIGS. 6 and 7;

FIG. 10 is a block diagram showing another embodiment of the digital capstan servo circuit according to the present invention; and FIG. 11 is a block diagram showing a further example of the invention which is applied to a servo circuit of a PWM system.

DESCRIPTION OF THE PREFERRED EMBODIMENTS

Figure 1:
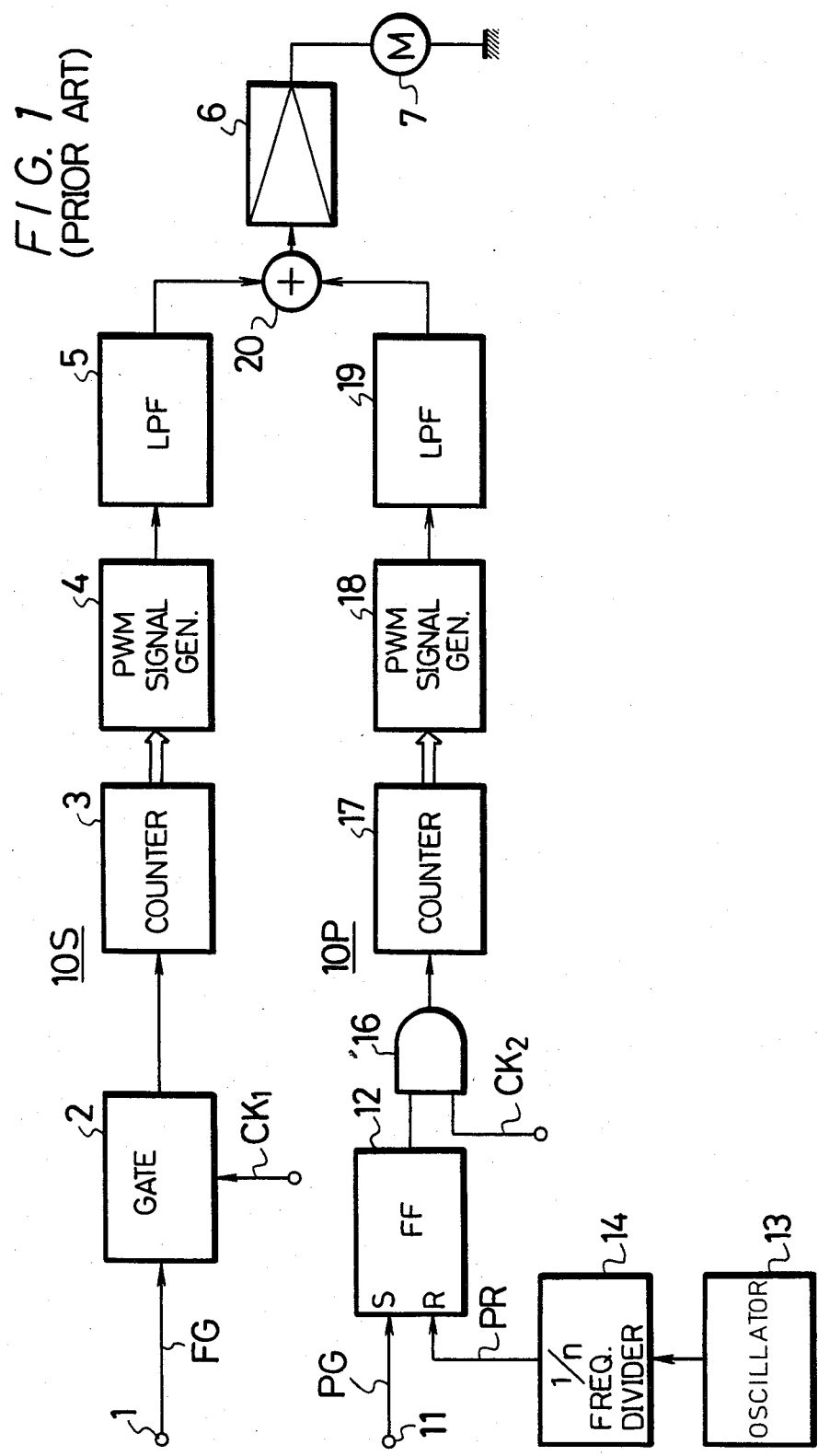
FIG. 1 is a block diagram of a previously proposed digital capstan servo circuit.
Figure 2:
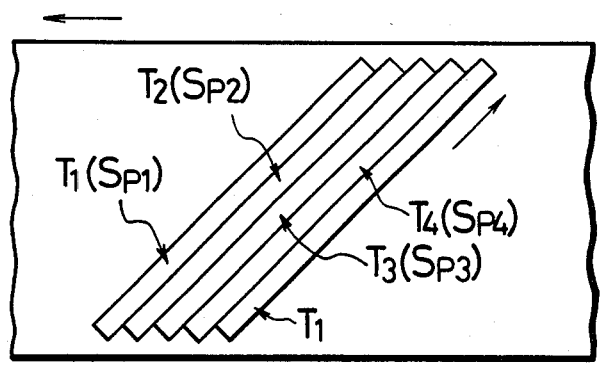
FIGS. 2 and 3 are respectively track patterns used for explaining the present invention.
Figure 3:
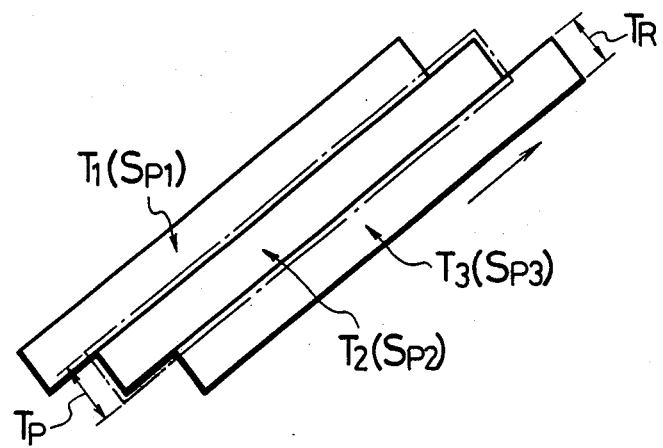

The present invention will be described hereinafter with reference to the attached drawings.

Firstly, in the digital capstan servo circuit according to the present invention, a rotation signal and a counter are used common and this common counter is operated in time sharing manner so that a rotation speed control signal and a rotation phase control signal can be provided.

To this end, in accordance with the present invention, the speed and phase control systems for the rotating member are partially constructed in the digital fashion and the means or circuit which generates the phase control signal on the basis of the output from the counter to be controlled by the phase signal of the rotating member is associated with the mean value setting means or circuit of the phase control signal so that the mean value setting circuit is being operated until the speed of the rotating member reaches a range of predetermined speed. More particularly, the capstan servo circuit is provided with the servo loop by which the rotation speed and the rotation phase of the capstan motor coincide with the reference speed and the reference phase, respectively. In this case, until the speed servo loop becomes stable, the phase servo loop is held at a certain constant value. And, after the speed servo loop becomes stable, the phase servo loop is operated to effect the phase servo.

The value of the phase control signal to be held is set to a lower or upper limit value of the dynamic range of the phase servo system. Meanwhile, the phase lock point in the phase servo circuit is set to a point near the center of the dynamic range of the phase servo circuit. Thus, when the phase servo operation is started, the phase has to always be pulled in from the endmost point so that it takes a considerably extra time to lock the phase.

For this reason, in such case, the value of the phase control signal to be held is preferably set to the intermediate value of the dynamic range.

Now, an embodiment of the present invention will be described in detail with reference to FIGS. 4 to 9.

FIG. 4 is a systematic block diagram showing an embodiment of the digital capstan servo circuit according to the present invention. In FIG. 4, reference numeral 10 generally designates a digital capstan servo circuit. The above rotation signal FG (see FIG. 5A) is applied to a terminal 1. A monostable multivibrator 21 is triggered by this rotation signal FG to thereby produce a multi-output $M_1$ shown in FIG. 5B. This multi-output $M_1$ is supplied to an AND gate 22 as a gate pulse thereof. Accordingly, since a clock CK is supplied from the AND gate 22 to a counter 3 of the next stage during only a period $T_M$ shown in FIG. 5B, the counter 3 is operated during only the period $T_M$.

When the rotation speed of the capstan (not shown) is in the stable state, namely, the rotation signal FG having the period $T_F$ shown in FIG. 5A is applied to the terminal 1, the counter 3 is so selected that the counting operation of the counter 3 becomes overflow at least once. According to this embodiment, the counter 3 becomes overflow at approximately every $\frac{2}{3}T_F$ and then starts the counting operation again. Thus, the final count output generated from the counter 3 at that time becomes exactly half the maximum value of the count output.

FIG. 5D shows a waveform of this count output which is converted to the form of an analog output.

The count output from the counter 3 is supplied to first and second latch circuits 24A and 24B and respectively stored or latched therein in response to first and second latch pulses $P_{LS}$ and $P_{LP}$, which are generated at predetermined different timings as will be described later. The latch outputs from the first and second latch circuits 24A and 24B are respectively supplied to first and second D/A (digital-to-analog) converters 25A and 25B thereby converted to the form of analog outputs. Since the first latch output corresponds to the rotation speed control signal and the second latch output corresponds to the rotation phase control signal as will be described later, the above analog outputs are the rotation speed control signal and also the rotation phase control signal.

These control signals are supplied to a capstan motor 7 similarly as described above.

Reference numeral 27 designates a latch pulse generating circuit which generates the first latch pulse $P_{LS}$ (see FIG. 5C). In this embodiment, the first latch pulse $P_{LS}$ is formed on the basis of the rotation signal FG. The first latch pulse $P_{LS}$ is generated in response to the interval during which the multi-output $M_1$ is at "0", so that the data from the counter 3 is latched in the latch circuit 24A in the interval during which the above multi-output $M_1$ is at "0".

The rotation signal FG corresponds to the rotation speed of the capstan, the multi-output $M_1$ for gating the AND gate 22 is obtained in synchronism with this rotation signal FG, and the first latch pulse $P_{LS}$ is also obtained in synchronism with the rotation signal FG and the multi-output $M_1$. Then, if the final count output of the counter 3 within the one period $T_F$ of the rotation signal FG is latched by the first latch pulse $P_{LS}$, the first latch output changes in response to the rotation speed of the capstan so that the first latch output becomes the output proportional to the rotation speed of the capstan. As a result, the first analog output can be used as the rotation speed control signal.

After the first latch pulse $P_{LS}$ is obtained, the counter 3 is reset and starts the counting operation at the rising-up or leading edge of the next multi-output $M_1$.

Reference numeral 28 designates a latch pulse generating circuit which generates the second latch pulse $P_{LP}$ (see FIG. 5G). In this embodiment, the second latch pulse $P_{LP}$ is formed in such a manner that the oscillatory output from an oscillator 13 is frequency-divided to a predetermined frequency by a frequency divider 29 and then fed to the latch pulse generating circuit 28. In this case, the predetermined frequency is selected to be the same as that of the rotation signal FG, which is selected as the frequency of about 1 kHz in this embodiment. The above frequency-divided output is shifted by a predetermined phase, namely, so as to have a phase difference of approximately $\pi/4$ relative to the phase of the rotation signal FG obtained when the rotation speed of the capstan is locked and further, so as to have the similar phase difference of $\pi/4$ relative to the phase of the first latch pulse $P_{LS}$ to thereby produce the second latch pulse $P_{LP}$.

The reason why the above phase relation is selected is as follows. As will be clear from FIG. 5, the resultant count output at this phase relation is selected to be exactly near the half of the maximum value. Thus, the lock point of the phase can be set to approximately the center of the phase lock range.

In this case, the phase of the second latch pulse $P_{LP}$ is the fixed phase.

When the relation between the frequency and phase of the second latch pulse $P_{LP}$ is selected as described above, the second latch pulse $P_{LP}$ is generated during the period in which the first count output within one period $T_F$ is overflown so that the count output at that time is latched in the second latch circuit 24B. When the rotation phase of the capstan is not in such a relation as shown in the figure, the counter output latched by the second latch pulse $P_{LP}$ is different. Thus, the second latch output becomes the signal corresponding to the rotation phase of the capstan so that the analog output from the second D/A converter 25B can be used as the rotation phase control signal. Consequently, the rotation phase of the capstan is controlled in such a manner that the phase difference $\phi$ between the rotation signal FG and the second latch pulse $P_{LP}$ shown in FIGS. 5A and 5G may become constant without fail.

Reference numeral 30 designates an out-of-lock range detecting circuit which detects whether the count content of the counter 3 is within the lock range or not. When that count content is out of the above lock range, the out-of-lock range detecting circuit 30 respectively controls the latch circuits 24A and 24B independently with the result that in, for example, the rotation speed servo system, the signal waveform becomes a ramp waveform as shown in FIG. 5E, while in the rotation phase servo system, the signal waveform becomes a ramp waveform as shown in FIG. 5F.

As set forth above, with the digital capstan servo circuit 10 in which the pilot signal frequency-multiplexed on the video signal is reproduced and then is employed as the reference signal for the reproducing tracking the frequency of the rotation phase signal for the capstan utilized for the phase servo in a recording mode can be made arbitrary. Therefore, if the latch timing and the latching order of the first and second latch circuits 24A and 24B are determined, the counter 3 can be used in time sharing manner so that the rotation speed and the rotation phase can be measured by only the rotation signal FG and the single counter 3 without being influenced with each other.

The timings of the above first and second latch pulses $P_{LS}$ and $P_{LP}$ are in synchronism with the timing of the clock signal CK which is supplied to the counter 3.

The number of the overflow of the counter 3 within one period $T_F$, namely, the number of idlings is not limited to once as mentioned above. When the counter 3 which performs the idling N times (N is positive integer) per one period $T_F$ is utilized, arbitrary one ramp waveform is used as the ramp waveform for the rotation phase control.

When the number of the idling is twice or more, it is possible to make the quantization of the rotation phase rough and then to widen the lock range or while to maintain quantization unchanged, to widen the lock range.

As described above, according to the digital capstan servo circuit of the invention wherein the pilot signal frequency-multiplexed on the video signal is reproduced and used as the reference signal for the playback tracking, since the circuit is used common, the circuit can be simplified much as compared with the conventional capstan servo circuit. In addition, since the sampling period of the rotation phase can be selected to be the same as the sampling period of the rotation speed, the servo characteristic of the rotation phase can be improved greatly.

FIG. 6 is a block diagram showing an example of the speed and phase control circuit 10 used in the digital capstan servo circuit shown in FIG. 4. Reference numeral 10A designates a speed servo system and 10B a phase servo system. In this case, a rotating member to be controlled is a capstan though not shown. Reference numeral 101 designates a capstan motor which is provided with a frequency generator (FG) and a rotation phase signal generator (PG) though not shown. The frequency generator (FG) and the rotation phase signal generator (PG) respectively generate a speed signal (square wave signal) proportional to the rotation speed of the capstan motor 1 and a rotation phase signal (pulse signal) associated with the rotation phase thereof.

In the speed servo system 10A, reference numeral 2A designates a counter supplied with the clock CK and measuring the rotation speed of the capstan motor 101 and 3A a latch circuit for latching the counter output. A set pulse $P_{SS}$ for the counter 2A is formed on the basis of, for example, the rising-edge or leading edge of the speed signal, while a latch pulse (strobe pulse) $P_{LS}$ for the latch circuit 3A is formed on the basis of, for example, the falling-edge or trailing edge of the speed signal. Thus, the counter output proportional to the rotation speed of the capstan motor 101 is latched in the latch circuit 3A, converted to a predetermined analog speed control signal by a D/A converter 4A and then supplied through a drive amplifier 105 to the capstan motor 101.

When the rotation speed of the capstan motor 1 is deviated largely from the reference speed, the output from the counter 2A becomes overflow.

When the output of the counter 2A is in overflow state, the counter output has to be held at a value just before the counter 2A becomes overflow. To this end, the counter 2A is provided with an overflow detection and control circuit 6A.

In the phase servo system 10B, there are provided a counter 7B supplied with the clock CK and measuring the rotation phase of the capstan motor 101 and a latch circuit 8B similarly as in the speed servo system 10A. The counter 7B is set by a rotation phase reference signal $P_{SP}$ (pulse signal having the same period as that of the rotation phase signal). The counter output is latched in the latch circuit 8B in response to a latch pulse $P_{LP}$ which is based on the rotation phase signal. The latch output proportional to the rotation phase difference is converted to an analog phase control signal $S_P$ by a D/A converter 9B and then supplied to the capstan motor 101 together with the above speed control signal $S_S$, to perform such control that the rotation phase of the capstan motor 101 is locked to the reference phase. Reference numeral 111 designates an adding circuit or mixer by which both of the analog phase control signal $S_P$ and the speed control signal $S_S$ are added together and then supplied to the capstan motor 101 through the drive amplifier 105.

The counter 8B and the D/A converter 9B constitute a phase control signal generating means or circuit 12B. And, particularly in this example, there is provided an intermediate value setting means or circuit 15B for the phase control signal $S_P$ in association with the phase control signal generating circuit 12B. According to this example, a set circuit which forcibly sets the latched data in the latch circuit 8B to the data of intermediate value of the maximum latch data is used as the above intermediate value setting circuit 15.

Figure 7:
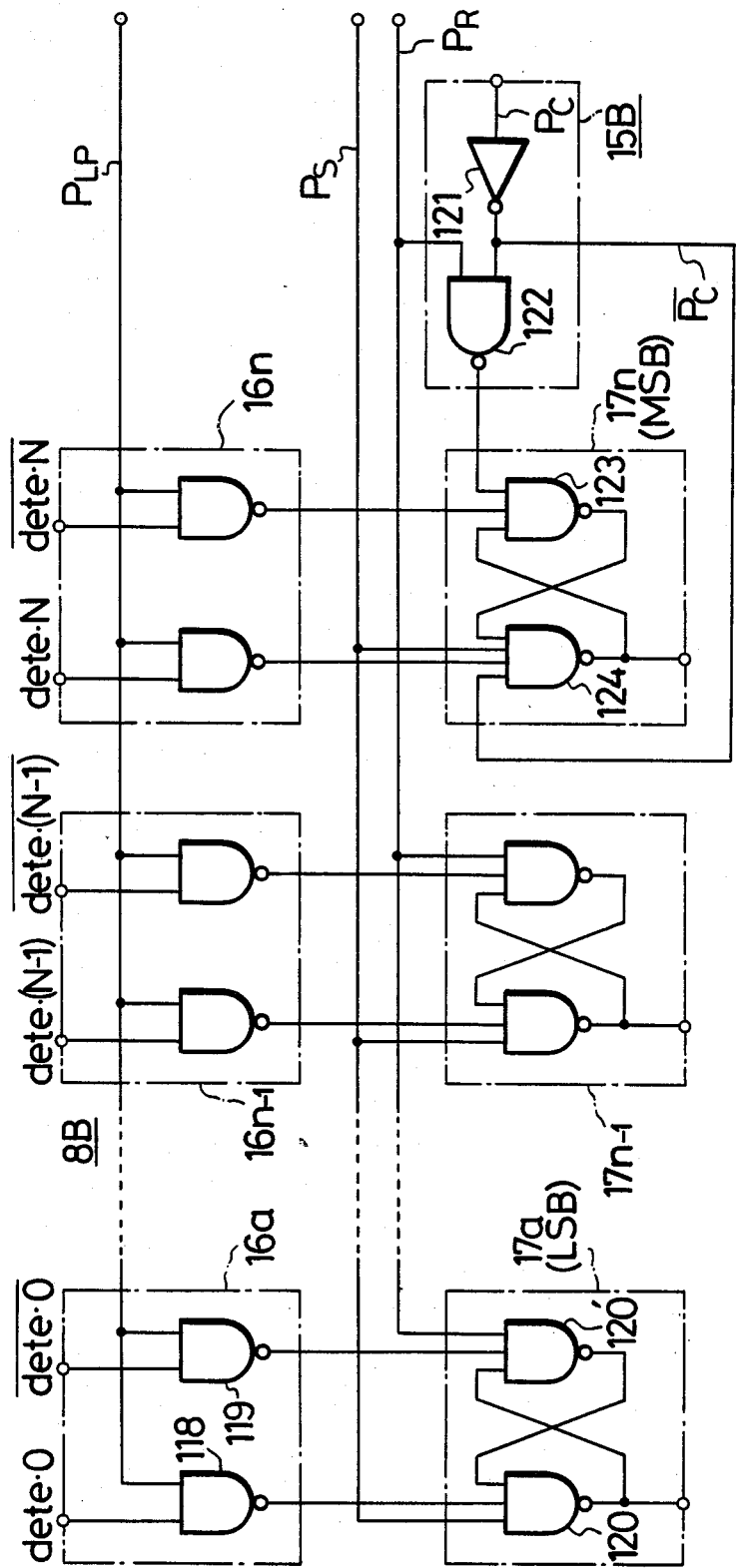
FIG. 7 is a diagram of a practical circuit showing parts of the example shown in FIG. 6.

FIG. 7 is a diagram showing an example of the latch circuit 8B and the set circuit 15B used as the intermediate value setting circuit shown in FIG. 6.

The example of the latch circuit 8B shown in FIG. 7 is such one which latches the counter output of N+1 bits (N is a positive integer). Gate circuits $16_a$ to $16_n$ and flip-flops $17_a$ to $17_n$ are respectively provided to correspond to bits each. Each of the gate circuits $16_a$ to $16_n$ is formed of a pair of NAND gates 118 and 119 to which the latch pulse $P_{LP}$ and data (data of N+1 bits) being gated thereby are supplied.

Each of the flip-flops $17_a$ to $17_n$, excepting the flip-flop $17_n$ corresponding to the most significant bit (MSB), is formed of a pair of 3-input NAND gates 120 and 120' and therefore a set pulse $P_S$ and a reset pulse $P_R$ are supplied in addition to the outputs from the gate circuits $16_a$ to $16_{n-1}$ to each of the flip-flops $17_a$ to $17_{n-1}$. The set pulse $P_S$ serves to set each output from the flip-flops $17_a$ to $17_{n-1}$ to "1", while the reset pulse $P_R$ serves to set each of them to "0". The set and reset pulses $P_S$ and $P_R$ are both the control signals which perform such control that when the output from the counter 7B is converted to the form of analog signal, it has a waveform (ramp waveform) suitable for controlling the rotation phase as will be described later.

The set circuit 15B is associated with the flip-flop $17_n$ which corresponds to the most significant bit. The set circuit 15B comprises an inverter 121 and a NAND gate 122 as shown in FIG. 7, and a pulse $P_C$ shown in FIG. 8C is supplied to the inverter 121. The pulse $P_C$ is such a pulse which indicates whether the rotation speed is within the speed lock range or not. In this example, the output from the decoder (not shown) provided within the overflow detection and control circuit 6A (see FIG. 6) is used as the pulse $P_C$. More specifically, the pulse $P_C$ is formed of a speed pulse $P_U$ (see FIG. 8A) which is obtained when the rotation speed is considerably higher than the speed in the lock range and a speed pulse $P_D$ (see FIG. 8B) which is obtained when the rotation speed is considerably lower than the speed in the lock range. Thus, the pulse $P_C$ regarding the rotation speed is obtained by supplying both the pulses $P_D$ and $P_U$ through an OR gate 25A (see FIG. 6). In this pulse $P_C$, the interval $T_N$ designates the interval out of the lock range and $T_L$ the lock range interval.

A NAND output of a pulse $\overline{P_C}$ (see FIG. 8D) having the phase inverted and a reset pulse $P_R$ (see FIG. 8F) from the NAND gate 122 is supplied to one NAND gate 123 which comprises the flip-flop $17_n$ with other NAND gate 124, and the inverted pulse $\overline{P_C}$ from the inverter 121 is supplied to the other NAND gate 124.

The operation of the latch circuit 8B including the set circuit 15B will be described next. The set pulse $P_S$ and the reset pulse $P_R$ are selected to have polarities shown in FIGS. 8E and 8F when the rotation speed is out of the lock range, namely, in the interval $T_N$. Therefore, during the interval $T_N$, the outputs from the least significant bit (LSB) of the flip-flop $17_a$ to the MSB-1 of the flip-flop $17_{n-1}$ all become "0".

Although the output (NAND output) from the set circuit 15B is at "H" level (high level) during the above interval $T_N$, the pulse $\overline{P_C}$ having the phase inverted is "0" so that one input of the 4-input NAND gate 124 becomes "0", thus the output of the flip-flop $17_n$ being made as "1". That is, in the interval $T_N$ where the rotation speed is out of the lock range, only the MSB bit becomes at "1" so that data having the dynamic range half that of the latch circuit 8B is set by the set circuit 15B. Accordingly, the phase control signal $S_P$ has the level half the maximum control level.

In the interval $T_L$ wherein the rotation speed is within the lock range, the phase of the pulse $P_C$ is inverted. Thus, the flip-flop $17_n$ for the MSB is released from its locked state and the polarities and pulse widths of the set pulse $P_S$ and the reset pulse $P_R$ are selected in such a manner that the output which results from converting the output of the counter 7B to the analog form may have the ramp waveform as shown in FIG. 9A. In this case, since the set pulse $P_S$ and the reset pulse $P_R$ both become at "1" during the ramp interval $T_{RL}$ (see FIG. 9D), the latch operation for the data of N+1 bits is carried out in response to the latch pulse $P_{LP}$.

As described above, since the level of the phase control signal $S_P$ when the rotation speed is out of the lock range is made half the maximum amplitude, when the rotation speed becomes within the lock range and thereby the phase servo system is released from its locked state, the phase servo is started to get effective at the phase control signal $S_P$ having the level half the maximum amplitude, thus the phase-lock time of the phase servo being reduced. In other words, the pull-in speed of phase becomes high.

In the digital capstan servo circuit which performs the phase servo operation in the digital manner, since the set and reset pulses $P_S$ and $P_R$ shown in FIGS. 8 and 9 have been used, they do not have to be formed newly and hence the above operation can be carried out by the addition of the set circuit 15B and few other circuits.

FIGS. 10 and 11 are respectively block diagrams showing other embodiments of the digital capstan servo circuit according to the present invention.

FIG. 10 shows an example of the digital capstan servo circuit wherein a measuring counter is used common. In this case, if it is arranged such that the speed control ramp waveform and the phase control ramp waveform may not be overlapped to each other, one counter, for example, the rotation speed measuring counter 2A can be also used as the phase measuring counter. The configuration for the circuit of the above counter being used common is not directly concerned with the subject matter of the present invention and therefore its detailed description will not be made.

Also, in this embodiment, it is sufficient that the set circuit 15B is associated with the latch circuit 8B.

FIG. 11 shows a further example of the digital capstan servo circuit according to the present invention which is applied to the PWM type servo system, and an example of the phase servo circuit. In example of the figure, a clock CK to be supplied to a counter 7B is controlled by a gate pulse $P_G$ formed of the rotation phase signal and the reference phase signal. The counter output from the counter 7B is transferred to a memory 130 and the most significant bit of the counter output thus transferred is read out from the memory 130 to thereby allow a flip-flop 131 to be set. Then, the flip-flop 131 is reset by an inverted pulse $\overline{CK_0}$ which results from inverting a clock $CK_0$ having the same bit period as the most significant bit by an inverter 132.

Since the timing at which the most significant bit is obtained changes depending on the counter output from the counter 7B, the set timing of the flip-flop 131 becomes different whereby the pulse width of the clock $CK_0$ is modulated. Thus, if the clock pulse $CK_0$ is supplied through a low-pass filter 133, a phase control signal $S_P$ corresponding to the rotation phase of the capstan motor 1 is formed.

In the rotation phase servo circuit according to the PWM system as described above, since the memory 130, the flip-flop 131 and the low pass filter 133 constitute the phase control signal generating means or circuit 12B, the intermediate value setting means or circuit 15B is provided in association with this phase control signal generating circuit 12B.

In this embodiment, the intermediate value setting circuit 15B is formed of logic gates. The mean value setting circuit, or the logic gate 15B is formed of first and second AND gates 141 and 142 and an OR gate 143. The first AND gate 141 serves to gate the output data from the memory 130, and a pulse $\overline{P_C}$ resulting from inverting in phase the pulse $P_C$ by an inverter 144 is used as the gate pulse thereof. Meanwhile, the second AND gate 142 serves to gate the clock $CK_0$, and the pulse $P_C$ is used as the gate pulse thereof. The OR output of the first and second AND gates 141 and 142 from the OR gate 143 is used as the set pulse for the flip-flop 131.

With the mean value setting circuit 15B arranged as described above, when the rotation speed enters into the lock range (the interval $T_L$ as shown in FIG. 8D), the first AND gate 141 is opened and the flip-flop 131 is set by the output data from the memory 130 so that the same rotation phase servo as mentioned above is carried out. And, in the interval $T_N$ (see FIG. 8D) during which the rotation speed is out of the lock range, the second AND gate 142 is opened so that the flip-flop 131 is set and/or reset by the pulse $CK_0$ of the constant period and hence the flip-flop 131 generates the pulse having the duty, 50%. Since the pulse output having the duty, 50% becomes the analog output having approximately the intermediate value of the dynamic range, the same effect as described above can be achieved.

With the present invention, the rotating member is not limited to the above capstan but can be other rotating member such as a rotary drum and so on.

As described above, according to the present invention, the predetermined phase control signal to be held can be obtained by the circuit of relatively simple configuration so that the phase-lock time can be reduced as was desired.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A digital servo circuit for controlling the rotational speed and phase of a rotating motor in a magnetic recording/reproducing apparatus to a desired speed and desired phase relative to a fixed phase by supplying a control signal to said motor, said digital servo circuit comprising:

a source of FG pulse signals generated in synchronism with the rotation of said motor;

means for generating a periodic pulse signal in response to each FG pulse signal, respectively, having the same period as said respective FG pulse signal and divided into first and second durations;

a source of clock pulses having a predetermined frequency;

means for cyclically counting said clock pulses during said second duration and producing a counted output in response thereto, said counted output being reset to zero after a cyclic period in which a maximum counted number of clock pulses have been counted;

said frequency of said clock pulses and said maximum counted number being preselected such that, when said motor rotates at said preselected speed, the number of clock pulses occurring during said second duration exceeds said maximum counted number, whereby said second duration is divided into at least one complete cyclic period and a final incomplete period;

first latch pulse generating means for producing a first latch pulse in response to said FG pulse signals during said first duration at a first timing position when said counted output is proportional to the rotational speed of the motor;

first latch means for latching said counted output in response to said first latch pulse to produce a first counted value;

second latch pulse generating means for producing a second latch pulse during said second duration at a second timing position when said counted output corresponds to the phase of said motor;

second latch means for latching said counted output in response to said second latch pulse to produce a second counted value;

means for generating said control signal in response to said first and second latched counted values, and means for supplying said control signal to said motor for controlling the phase and speed of said motor.

2. A digital servo circuit according to claim 1, wherein said phase of said motor is the phase difference between each FG pulse signal and the next occurring second latch pulse, and wherein a phase lock range is defined as a range of the phase of said motor about said desired phase, and a speed lock range is defined as a range of a rotational speed of said motor about said desired speed; and said second latch pulse occurs during a selected one of said at least one complete cyclic periods when said phase is within said phase lock range; and said first latch pulse occurs immediately after said final incomplete cyclic period.

3. A digital servo circuit according to claim 2, further comprising:

means for detecting when the speed of said motor is out of said speed lock range in response to said counted output of said means for counting and for generating first and second latch override signals thereupon;

means for supplying said first and second override signals to said first and second latch means, respectively, to control said first and second latch means independently of said first and second latch pulses, such that the output of said first latch means is in accordance with said counted output during said final incomplete period, and the output said second latch means is in accordance with said counted output during said selected complete period.

4. A digital servo circuit according to claim 1, wherein said means for generating said control signal includes:

first and second digital to analog converters receiving the outputs of said first and second latch means, respectively, and for producing first and second analog outputs thereupon; and mixing means for generating said control signal in response to said first and second analog outputs.

5. A digital servo circuit according to claim 1, wherein said first and seocnd latch pulses are periodic signals with equal frequencies and are out of phase by a selected phase difference.

6. A digital servo circuit according to claim 2, further comprising:

means for setting said second counted value to the counted output corresponding to one half said maximum counted number when said speed of said motor is outside of said speed lock range.

* * * * *